(12) United States Patent
Patterson et al.

(10) Patent No.: US 7,574,418 B1
(45) Date of Patent: Aug. 11, 2009

(54) METHOD AND APPARATUS FOR STORING COMPOSITE DATA STREAMS

(75) Inventors: R. Hugo Patterson, Mountain View, CA (US); Allan Bricker, Sunnyvale, CA (US); Richard Johnsson, Palo Alto, CA (US)

(73) Assignee: Data Domain, Inc., Santa Clara, CA (US)

( * ) Notice: Subject to any disclaimer, the term of this patent is extended or adjusted under 35 U.S.C. 154(b) by 446 days.

(21) Appl. No.: 10/779,355

(22) Filed: Feb. 13, 2004

(51) Int. Cl.
*G06F 7/00* (2006.01)
*G06F 17/30* (2006.01)
*G06F 12/00* (2006.01)

(52) U.S. Cl. .............. 707/1; 707/6; 707/204; 707/205

(58) Field of Classification Search .......... 707/1, 707/202, 204
See application file for complete search history.

(56) References Cited

U.S. PATENT DOCUMENTS

| | | | | |
|---|---|---|---|---|
| 5,559,991 | A * | 9/1996 | Kanfi | 711/162 |
| 5,990,810 | A | 11/1999 | Williams | 341/51 |
| 6,876,835 | B1 * | 4/2005 | Marko et al. | 455/3.06 |
| 2001/0037323 | A1 | 11/2001 | Moulton et al. | 707/1 |
| 2002/0194209 | A1 * | 12/2002 | Bolosky et al. | 707/205 |
| 2003/0217083 | A1 * | 11/2003 | Taylor | 707/204 |
| 2004/0243643 | A1 * | 12/2004 | Hattrup et al. | 707/200 |
| 2007/0124794 | A1 * | 5/2007 | Marko et al. | 725/135 |

OTHER PUBLICATIONS

A. Muthitacharoen, B. Chen, and D. Mazieres. "A low-bandwidth network file system." ACM SOSP Conference, 2001.*
Proceedings of the FAST 2002 Conference on File and Storage Technologies, USENIX Association; Monterey, California USA, Jan. 28-30.*
Bloom Filter, National Institute of Standards and Technology, (1 pg); Bloom Filters Short Tutorial (5 pgs); Flip Code—Tutorial—Coding Bloom Filters (6 pgs) dated Nov. 2, 2002.
Proceedings of the FAST 2002 Conference on File and Storage Technologies, USENIX Association; Monterey, California USA, Jan. 28-30, 2002 (13 pgs).
A.Z. Broder, "Some Applications of Rabin's Fingerprinting Method. ", In Sequences II: Methods in Communication, Security, and Computer Science, Springer-Verlag, 1993 (10pg).
U. Manber, "Finding Similar Files in A Large File System." USENIX Conference, 1994 (11pg).
A. Muthitacharoen, B. Chen, and D. Mazieres. "A low-bandwidth network file system." ACM SOSP Conference, 2001 (14pg).
S. Quinlan and S. Dorward, "Venti: a new approach to archival storage", USENIX FAST conference, 2002. (14pg).

* cited by examiner

*Primary Examiner*—John R. Cottingham
*Assistant Examiner*—Kimberly Lovel
(74) *Attorney, Agent, or Firm*—Blakely, Sokoloff, Taylor & Zafman LLP

(57) ABSTRACT

A method and apparatus for storing composite data streams. According to one embodiment of the invention, a composite data stream is stored so that it may be restored. The storing of the composite data stream includes decomposing the composite data stream into a plurality of constituent data streams, segmenting at least one of the plurality of constituent data streams, and discarding those of the segments resulting from the segmenting which are determined to have been stored previously.

14 Claims, 9 Drawing Sheets

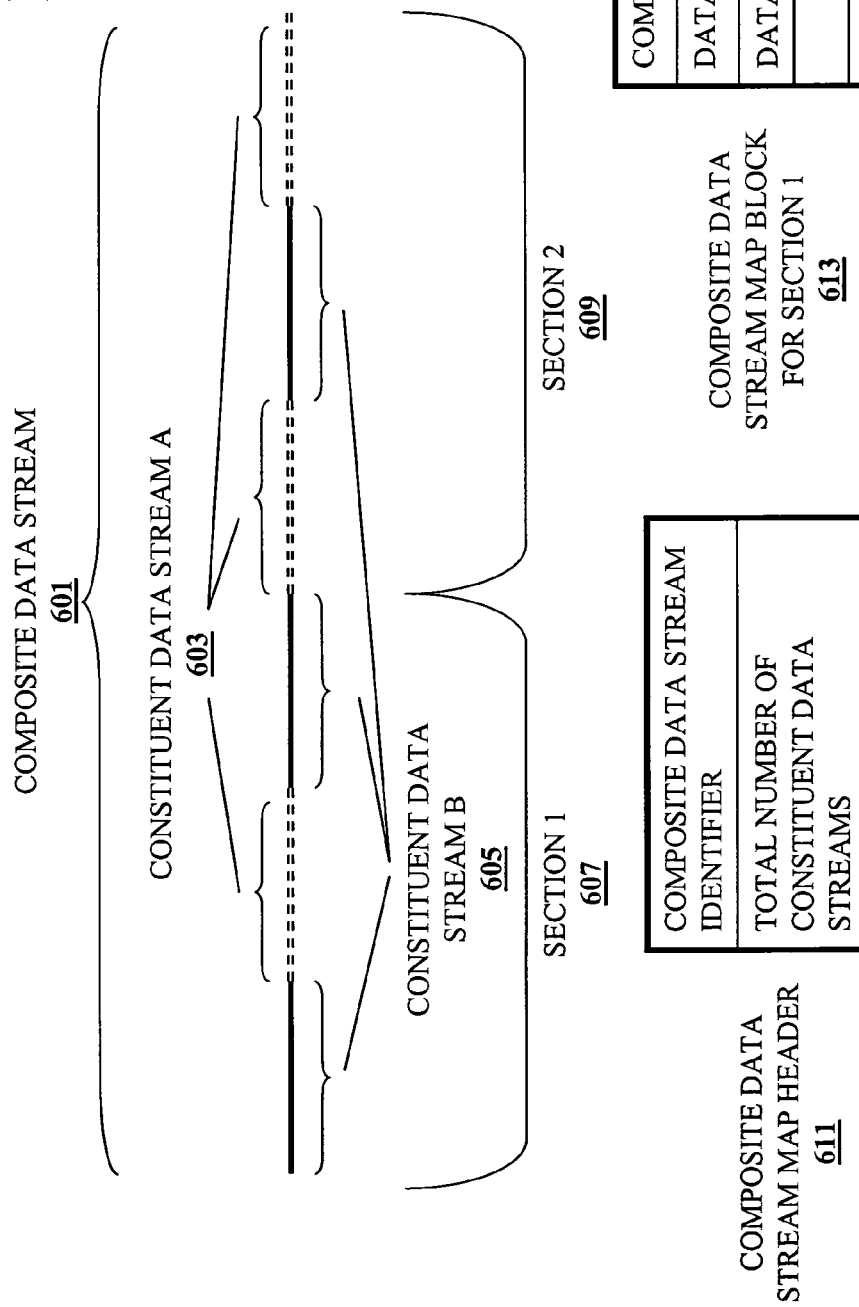

METHOD AND APPARATUS FOR STORING COMPOSITE DATA STREAMS

BACKGROUND OF THE INVENTION

1. Field of the Invention

The invention relates to the field of data storage. More specifically, the invention relates to storing composite data streams.

2. Background of the Invention

The amount of data to be stored continues to grow. In particular, the size of the applications and the data generated there from is increasing. Moreover, systems/users are backing up multiple copies of a given set of data to maintain multiple versions. For example, snapshots of a given database stored in a server are copied and stored over time, thereby allowing a given version/snapshot of a set of data to be restored.

There are existing backup systems that use what are called composite data streams. FIG. 1 is a diagram of composite data streams generated for storage as a backup according to the prior art. In FIG. 1, at a first time a constituent user data stream 103 is being backed up. The contents of the constituent user data stream is conceptually illustrated as a series of letters "APKLZATUALMNOAKAPLY ..." These letters may represent a variety of different levels of granularity of data and/or boundaries, including fixed sized chunks regardless of file boundaries, different files, fixed sized chunks within file boundaries etc. The constituent user data stream 103 is combined (e.g., multiplexed) with a constituent administrative data stream 104 to form a composite data stream 101 (e.g., a first snapshot) for backup storage. In other words, the constituent user data stream 103 is broken into data stream blocks that are interleaved with data stream blocks of the constituent administrative data stream 104 (e.g., tape markers, time stamps, hashes, error correction data, etc.).

A dashed line in the middle of FIG. 1 separates a second backup operation performed at a later time (a second time). In particular, at this later time the user data has been modified, and thus a constituent user data stream 105 is formed. The constituent user data stream 105 is conceptually illustrated as "APKLZAUALMNOAKAPLY ..." Thus, the difference between the constituent user data streams 103 and 105 is that the "T" has been removed from the constituent user data stream 105. The constituent user data stream 105 is combined with a constituent administrative data stream 106 to form a composite data stream 109 (e.g., a second snapshot) for backup storage. Since the constituent user data stream 105 is different from the constituent user data stream 103, the resulting composite data stream 101 is different from the composite data stream 109 (even if the constituent administrative data streams 104 and 106 are the same); In particular, at least certain of the data stream blocks of the constituent user data stream 103 in the composite data stream 101 contain different data than the data stream blocks of the constituent user data stream 105 in the composite data stream 109. Similarly, if the constituent administrative data streams 104 and 106 were different, the resulting composite data streams 101 and 109 would be different even if the user data (the constituent user data streams 103 and 105) had remained the same.

To provide an exemplary use of composite data streams, backup clients residing on different computers of a local area network may be provided and/or collect data to be backed up on their respective computers. This data to be backed up may or may not be in the form of a composite data stream as a result of the application(s) which created it. These backup clients may each transmit (e.g., over a network) data streams (e.g., constituent user data streams, which themselves may be composite data streams) to a backup server that forms composite data streams (e.g., by combining a constituent user data stream with one or more other constituent user data streams and/or an administrative data stream). It should be thus understood that there may be multiple layers of composite data streams. The backup server periodically transmits (e.g., directly or over a network) these composite data streams to a storage server (e.g., a network file server, a tape library emulator server, etc.) for storage, as well as maintains a catalog of the backups it is managing and what it has stored therein. Although forming composite data streams is common, different backup systems structure composite data streams differently (e.g., certain backup systems use fixed length blocks of user data separated by administrative data blocks; other backup systems punctuate variable length user files with administrative data; etc.).

Typically, much of the data across different snapshots remains the same (e.g., there is little difference between the constituent user data streams 103 and 105). For example, if the data is backed up for a given user on a daily basis and such user is updating only one of the number of files on a given day, the data in this file is the only data that has been modified. As a result, storage servers that store entire composite data streams are relatively inefficient in that they store large amounts of redundant data.

There are some backup systems that allow for the sharing of data across a number of different snapshots/versions to reduce the amount of data being stored. Such backup systems are referred to as segment reuse backup systems. Segment reuse backup systems typically operate by breaking up the data for each snapshot into segments. The segments of a current snapshot are compared to the segments of a previous snapshot to determine if there are matching segments. For any segments that match, only a pointer to the segment of the previous snapshot need to be stored to backup that segment from the current snapshot. In this manner, the efficiency of the backup system is improved by reducing the storage of redundant data.

BRIEF SUMMARY OF THE INVENTION

A method and apparatus for storing composite data streams is described. According to one embodiment of the invention, a composite data stream is stored so that it may be restored. The storing of the composite data stream includes decomposing the composite data stream into a plurality of constituent data streams, segmenting at least one of the plurality of constituent data streams, and discarding those of the segments resulting from the segmenting which are determined to have been stored previously.

These and other aspects of the present invention will be better described with reference to the Detailed Description and the accompanying Figures.

BRIEF DESCRIPTION OF THE DRAWINGS

The invention may best be understood by referring to the following description and accompanying drawings that are used to illustrate embodiments of the invention. In the drawings:

FIG. 6 is an exemplary diagram of a composite data stream map file according to one embodiment of the invention.

DETAILED DESCRIPTION OF THE INVENTION

In the following description, numerous specific details are set forth to provide a thorough understanding of the invention. However, it is understood that the invention may be practiced without these specific details. In other instances, well-known circuits, structures, standards, and techniques have not been shown in detail in order not to obscure the invention.

Figure 7A:
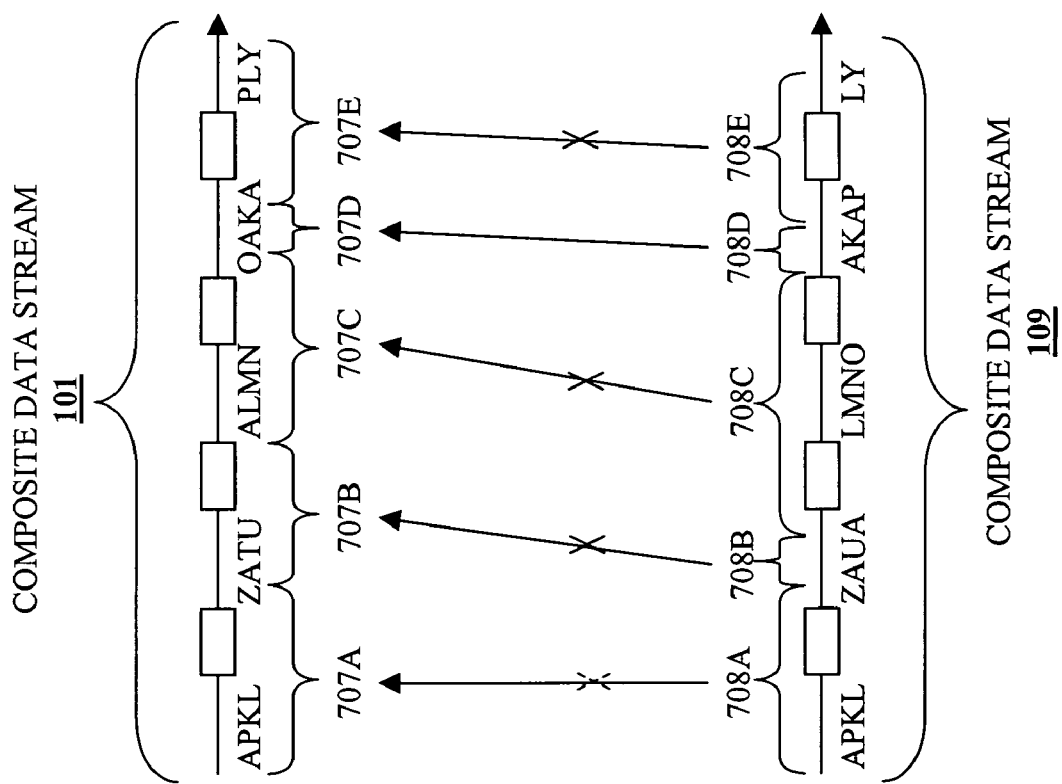
FIG. 7A illustrates application of segment reuse to composite data streams.

FIG. 7A illustrates application of segment reuse to composite data streams. In FIG. 7A, segments are started on each occurrence of the letter A for purposes of illustration; in embodiments of the invention, any number of techniques can be used to anchor segments in a data stream—e.g., a repeated pattern, a repeated hash pattern, etc. Thus, FIG. 7A illustrates that the composite data stream 101 has been divided into segments 707A-707E (707A=APKL, an administrative data block, and Z; 707B=ATU and an administrative data block; 707C=ALMN, an administrative data block, and O; 707D=AK; and 707E=A, an administrative data block, and PLY), while the composite data stream 109 has been divided into segments 708A-708E (708A=APKL, an administrative data block, and Z; 708B=AU; 708C=A, a first administrative data block, LMNO, and a second administrative data block; 708D=AK; and 708E=AP, an administrative data block, and LY). In addition, FIG. 7A illustrates the comparison of segments 707A-E to the segments 708A-E with the same letter. If the constituent administrative data streams 104 and 106 are the same, then the segments 708B, 708C, and 708E do not match and must be separately stored. If constituent administrative data streams 104 and 106 are not the same, then the segment 708A also does not match and must also be separately stored. (It should be understood that even in the alternative case where the user data did not change but the constituent administrative data streams did, then four segments would not find a match because segments 707A, 707B, 707C, and 707E each include an administrative data block). In either case, a number of segments need to be stored by the storage server applying segment reuse even though the change to the data was relatively minor. This results in relatively low compression efficiency and consumes resources, especially storage, to compress and store two versions of the same data.

Figure 7B:
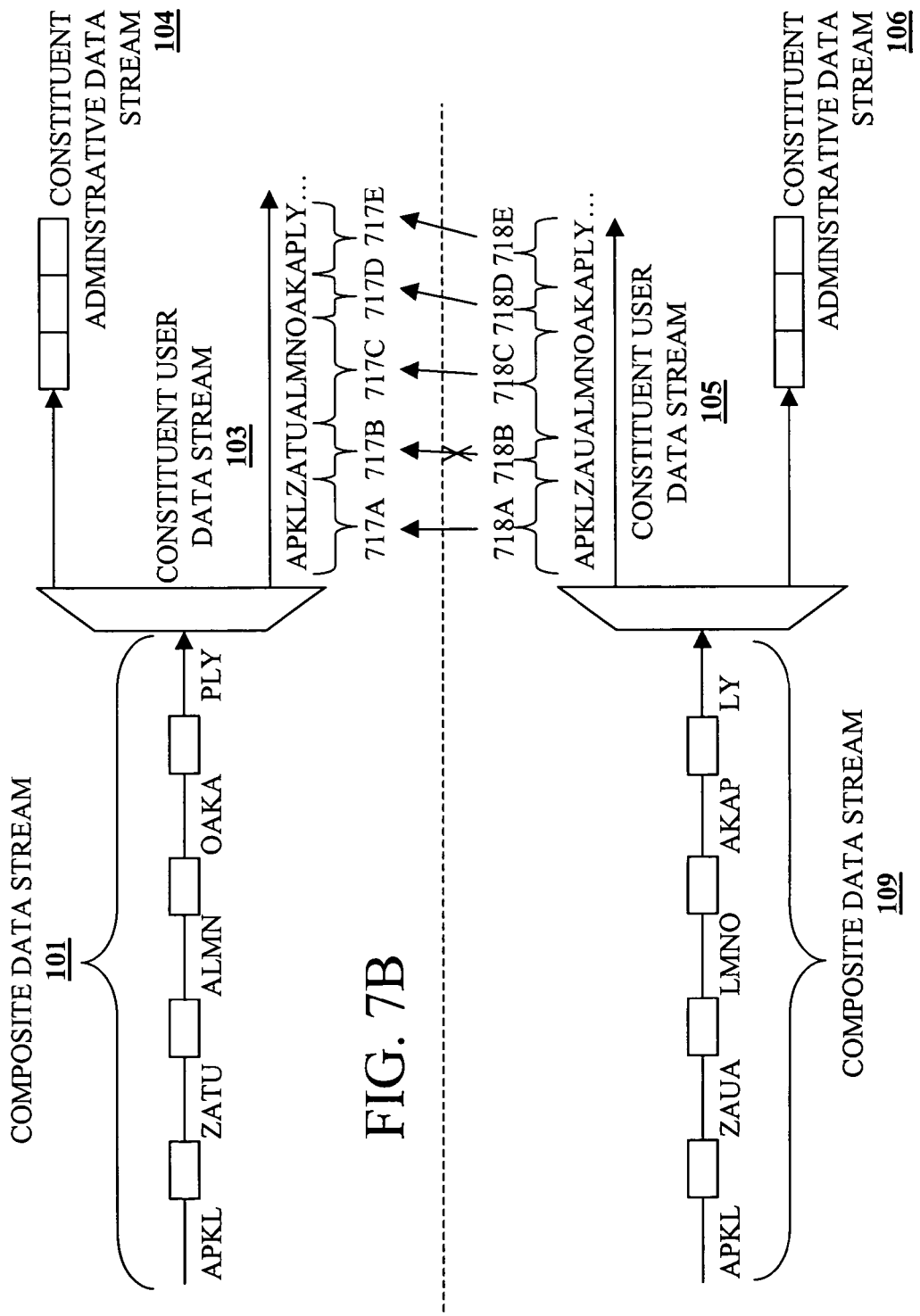
FIG. 7B illustrates an example of decomposing composite data streams prior to segmentation according to one embodiment of the invention.

FIG. 7B illustrates an example of decomposing composite data streams prior to segmentation according to one embodiment of the invention. FIG. 7B illustrates the composite data streams 101 and 109 being provided at different times. Each of the composite data streams 101 and 109 is decomposed into its constituent data streams prior to being segmented. FIG. 7B illustrates that the constituent user data stream 103 has been divided into segments 717A-717E (717A=APKLZ; 717B=ATU; 717C=ALMNO; 717D=AK; and 717E=APLY), while the constituent user data stream 105 has been divided into segments 718A-718E (718A=APKLZ; 718B=AU; 718C=ALMNO; 718D=AK; and 718E=APLY). In addition, FIG. 7B illustrates the comparison of segments 717A-E to the segments 718A-E with the same letter. Regardless of whether the constituent administrative data streams 104 and 106 are the same, only the segment 718B of the segments 718 does not match and must be separately stored (that is, segments 718A, 718C, 718D, and 718E need not be stored—only a reference to segments 717A, 717C, 717D, and 717E need be stored). (It should be understood that a similar effect applies to the constituent administrative data streams). This results in relatively higher compression efficiency and consumes fewer resources, especially storage.

Figure 1:
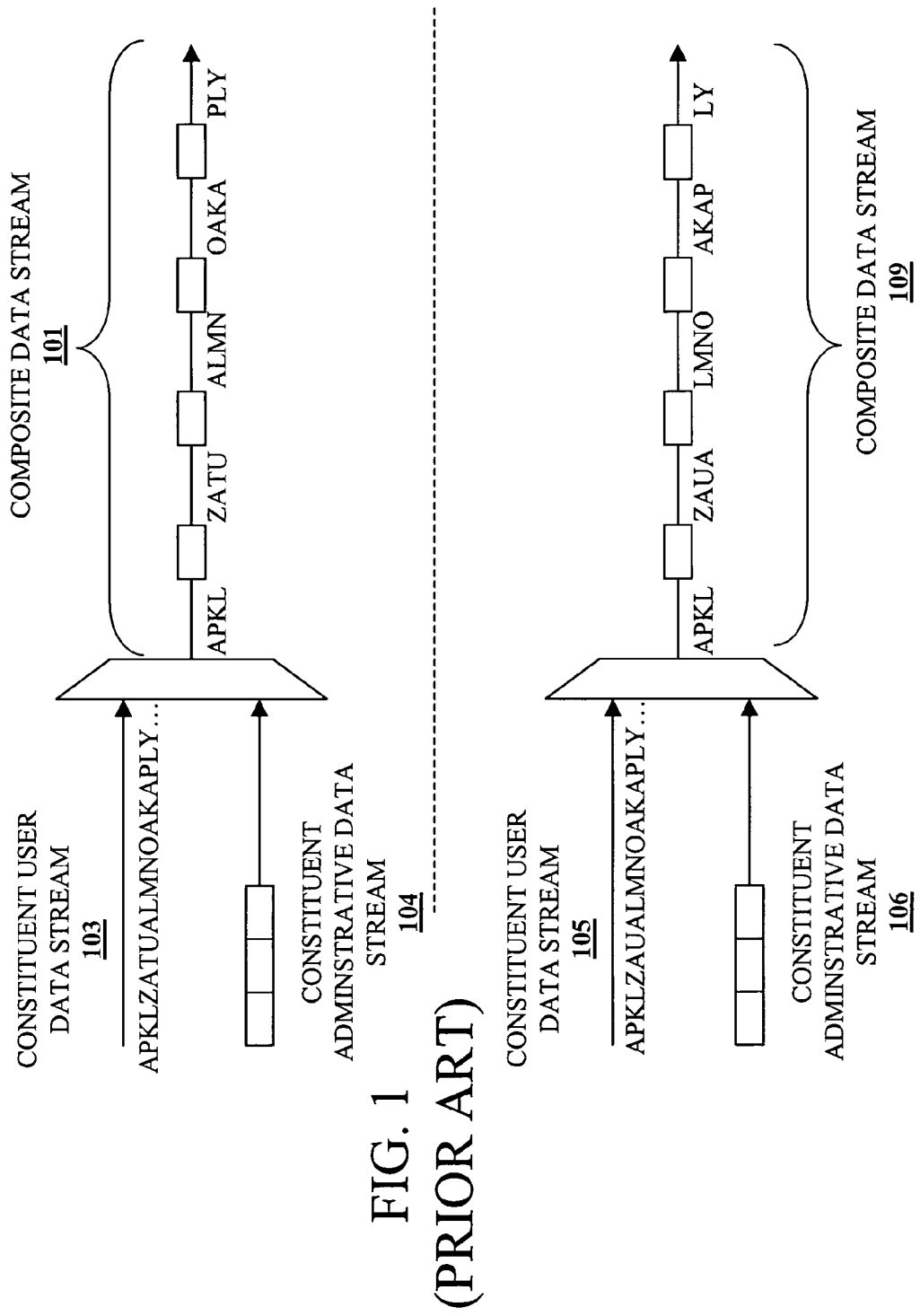
FIG. 1 is a diagram of composite data streams generated for storage as a backup according to the prior art.
Figure 2A:
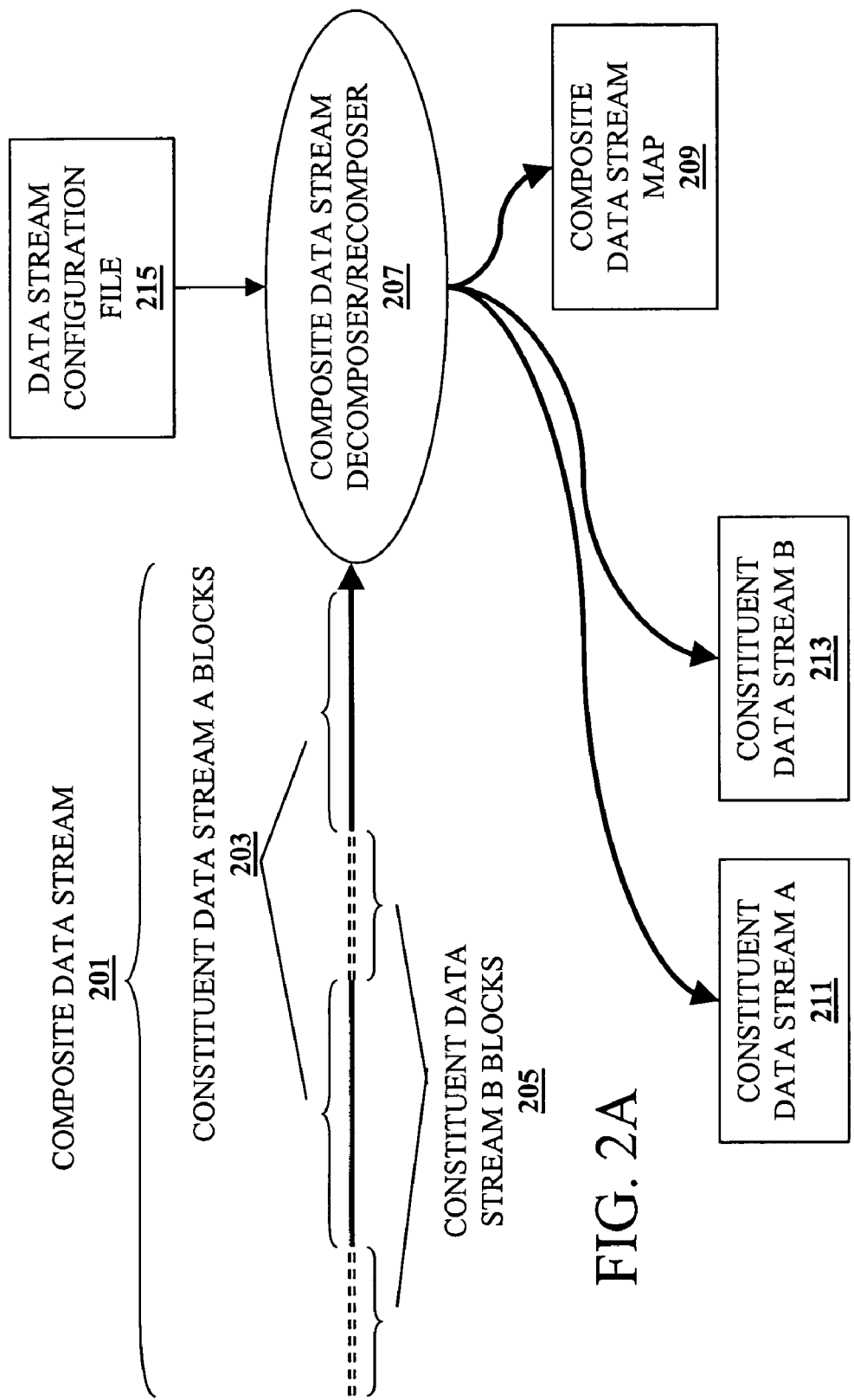
FIG. 2A is an exemplary diagram illustrating decomposing a composite data stream according to one embodiment of the invention.
Figure 2B:
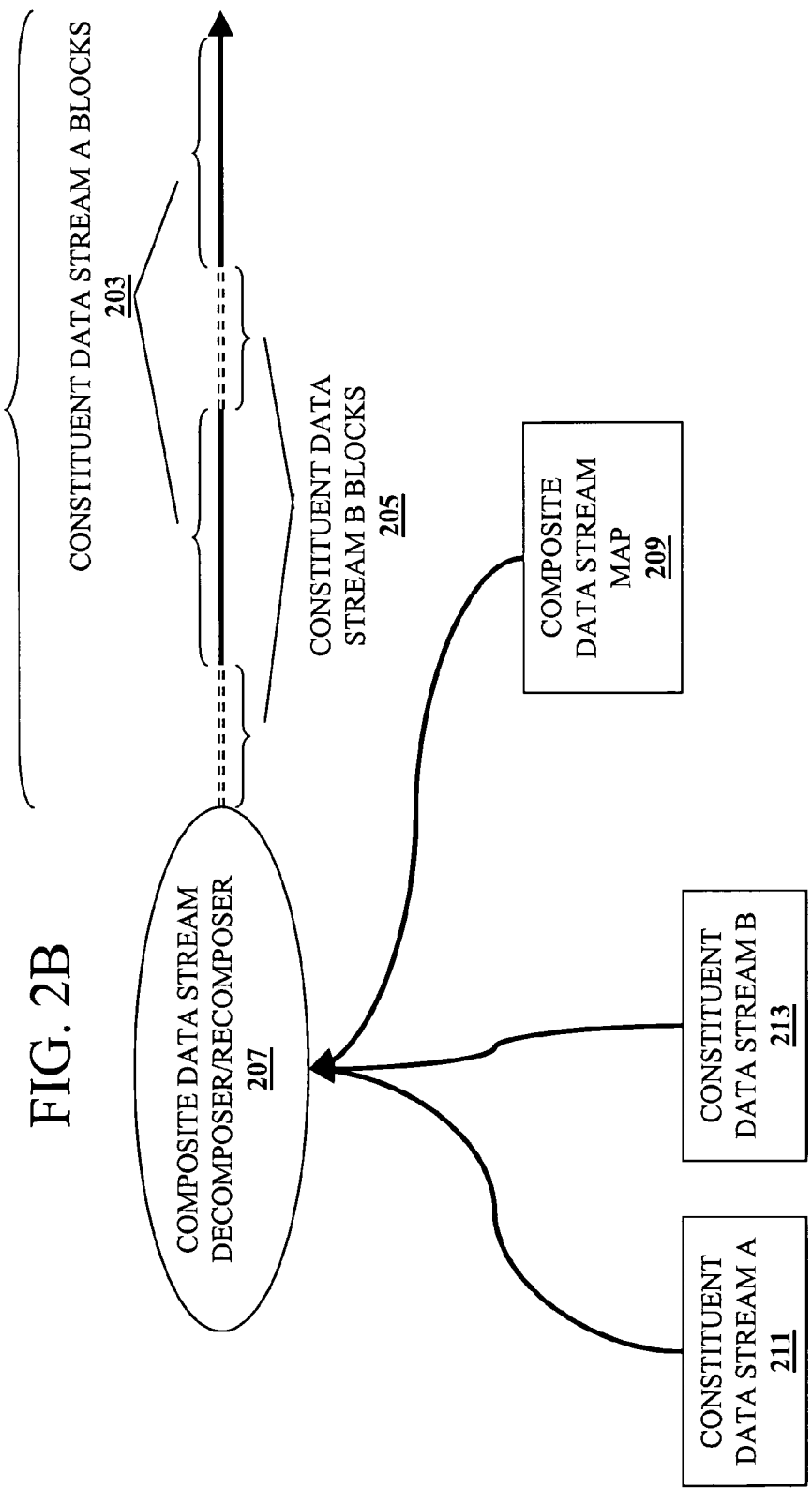
FIG. 2B is an exemplary diagram illustrating recomposing a composite data stream from files according to one embodiment of the invention.

FIGS. 2A-2B are exemplary diagrams illustrating a data stream decomposer/recomposer according to one embodiment of the invention. FIG. 2A is an exemplary diagram illustrating decomposing a composite data stream according to one embodiment of the invention. In FIG. 2A, a composite data stream decomposer/recomposer 207 receives a composite data stream 201. The composite data stream 201 includes interleaved data stream blocks from a constituent data stream A (see data stream blocks 203) and a constituent data stream B (see data stream blocks 205). A data stream configuration file 215 provides information to the composite data stream decomposer/recomposer 207 regarding the structure used by the backup system that created the composite data stream 201. The composite data stream decomposer/recomposer 207 uses the information provided by the composite data stream configuration file 215 to decompose the composite data stream 201. The composite data stream configuration file 215 may be a file created by an administrator, a file created and received remotely, a default configuration file, etc. In an alternative embodiment of the invention, the composite data stream decomposer/recomposer 207 processes a composite data stream without a composite data stream configuration file. For example, the composite data stream decomposer/recomposer 207 determines from the composite data stream itself the structure of the composite data stream (e.g., a certain number of bits are stored and analyzed for a certain bit pattern that indicates the structure of the composite data stream, initialization data in the composite data stream indicates the structure of the composite data stream, etc.).

The composite data stream decomposer/recomposer 207 decomposes the composite data stream 201 into the constituent data stream A 211 and the constituent data stream B 213. The composite data stream decomposer/recomposer 207 also generates a composite data stream map 209. The composite data stream map 209 indicates how the composite data stream was decomposed into the constituent data streams 211 and 213.

FIG. 2B is an exemplary diagram illustrating recomposing a composite data stream according to one embodiment of the invention. In FIG. 2B, the composite data stream decomposer/recomposer 207 recomposes the composite data stream 201 from the constituent data stream A 211 and the constituent data stream B 213 in accordance with the composite data stream map 209. Thus, the composite data stream 201 includes the interleaved data stream blocks 203 and 205. An example of a composite data stream map file will be described later.

The composite data stream decomposer/recomposer 207 illustrated in FIGS. 2A-2B can be implemented as software, hardware (e.g., an application specific integrated circuit), or a combination of hardware and software.

It should be understood that while embodiments of the invention are described herein (e.g., see FIGS. 7B, 2A, 2B, 4, 5, 6) with reference to an exemplary composite data stream made up of two constituent data streams (and often a constituent user data stream and a constituent administrative data stream), the invention is not limited to such composite data streams. Rather, the invention is applicable to a composite data stream formed by combining any number of different constituent data streams (e.g., one or more constituent user data steams and zero or more administrative data streams). In addition, the invention is applicable to composite data streams that have multiple layers (while a given composite data stream is made up of its constituent data streams, one or more of these constituent data streams may themselves be composite data streams; Thus, the term constituent data stream refers to a data stream (be it a composite data stream itself or not) that is combined with other data streams to form a composite data stream). It should be understood that in the case of a composite data stream with multiple layers, recursively decomposing the input composite data stream (either completely (into the smallest divisible data streams), partially (down a certain number of levels), selectively (certain constituent data streams are recursively decomposed further than others), etc.) is within the scope of the invention.

Figure 3:
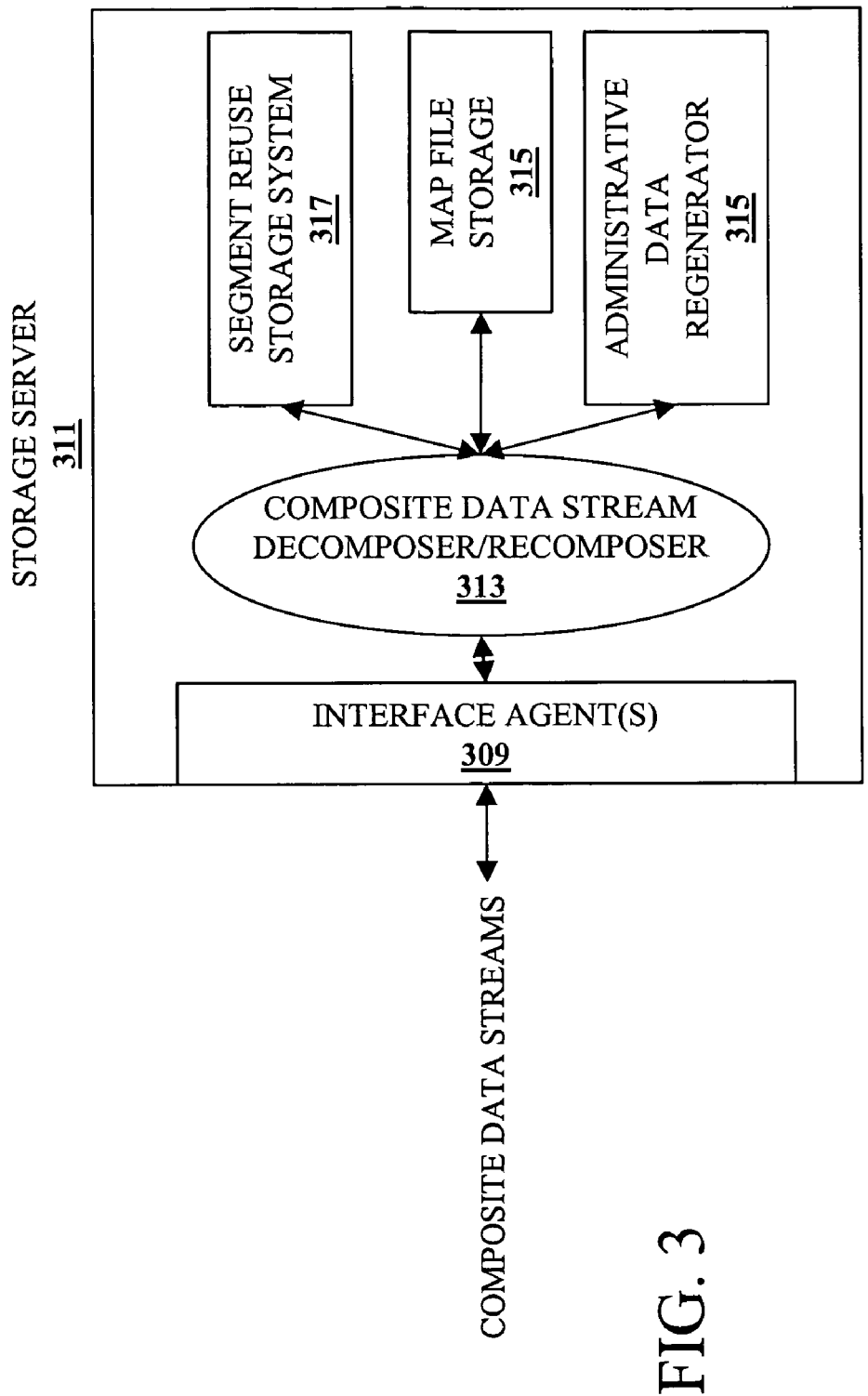
FIG. 3 is an exemplary diagram of a composite data stream decomposer/recomposer segment reusing storage server according to one embodiment of the invention.

FIG. 3 is an exemplary diagram of a composite data stream decomposer/recomposer segment reusing storage server according to one embodiment of the invention. The storage server 311 (e.g., a network file server, a tape library emulator server, etc.) includes a set of one or more interface agents 309, a composite data stream decomposer/recomposer 313, a segment reuse storage system 317, a map file storage 315, and (optionally) a constituent data stream regenerator 320. In one embodiment of the invention, the map file storage 315 and the segment reuse storage system 317 are a single storage unit, whereas in alternative embodiment of the invention the map file storage 315 and the segment reuse storage system 317 are multiple storage units.

Composite data streams may be communicated between one or more backup servers and the storage server 311 in a variety of ways—e.g., directly or over a network (e.g., LAN, SAN, WAN, etc.) using a link (e.g., wirelessly, Ethernet, fiber channel, FDDI, ATM, SCSI, etc.) and a protocol (e.g., TCP/IP, NFS, CIFS, NDMP, SCSI, etc.) that may or may not be layered.

The interface agent 309 communicates composite data streams with one or more backup servers. Incoming composite data streams are sent to the composite data stream decomposer/recomposer 313. In an alternative embodiment of the invention, the interface agent 309 and the composite data stream decomposer/recomposer 313 are implemented as a single module. The composite data stream decomposer/recomposer 313 decomposes (or demultiplexes) composite data streams into constituent data streams and creates map files to aid in their recomposition. The constituent data streams are stored by the segment reuse storage system 317. The map files generated by the composite data stream decomposer/recomposer 313 are stored in the map file storage 315. The optional administrative data regenerator 320 regenerates administrative data using an algorithm as described later herein.

Although FIG. 3 illustrates the storage server as including the map file storage 315 and the segment reuse storage system 317, alternative embodiments of the invention implement the segment reuse storage system 317 and/or the map file storage 315 separately from the storage server 311. For example, the composite data stream decomposer/recomposer 313 may decompose a composite data stream into constituent data stream files and transmits them over an Ethernet to a segment reuse storage farm for storage. Alternatively, the storage server 311 includes the map file storage 315 and the segment reuse storage system 317 as illustrated and is also networked to a storage farm.

While the backup clients and servers may be developed in conjunction with the storage server 311, the storage server 311 may be used with an existing composite data stream backup system, including the existing base of software used in backup clients and backup servers. In particular, the storage server's decomposing at backup and recomposing at restore provides the input and output (the composite data stream) expected by the existing base of composite data stream software, while at the same time allowing for more efficient storage. In addition, through the use of configuration files and/or composite data stream preprocessing, the storage server 311 may be made compatible with multiple different backup systems and/or different versions of backup system (s).

The storage server described above includes memories, processors, and/or ASICs. Such memories include a machine-readable medium on which is stored a set of instructions (i.e., software) embodying any one, or all, of the methodologies described herein. Software can reside, completely or at least partially, within this memory and/or within the processor and/or ASICs. For the purpose of this specification, the term "machine-readable medium" shall be taken to include any mechanism that provides (i.e., stores and/or transmits) information in a form readable by a machine (e.g., a computer). For example, a machine-readable medium includes read only memory ("ROM"), random access memory ("RAM"), magnetic disk storage media, optical storage media, flash memory devices, electrical, optical, acoustical, or other form of propagated signals (e.g., carrier waves, infrared signals, digital signals, etc.), etc.

Figure 4:
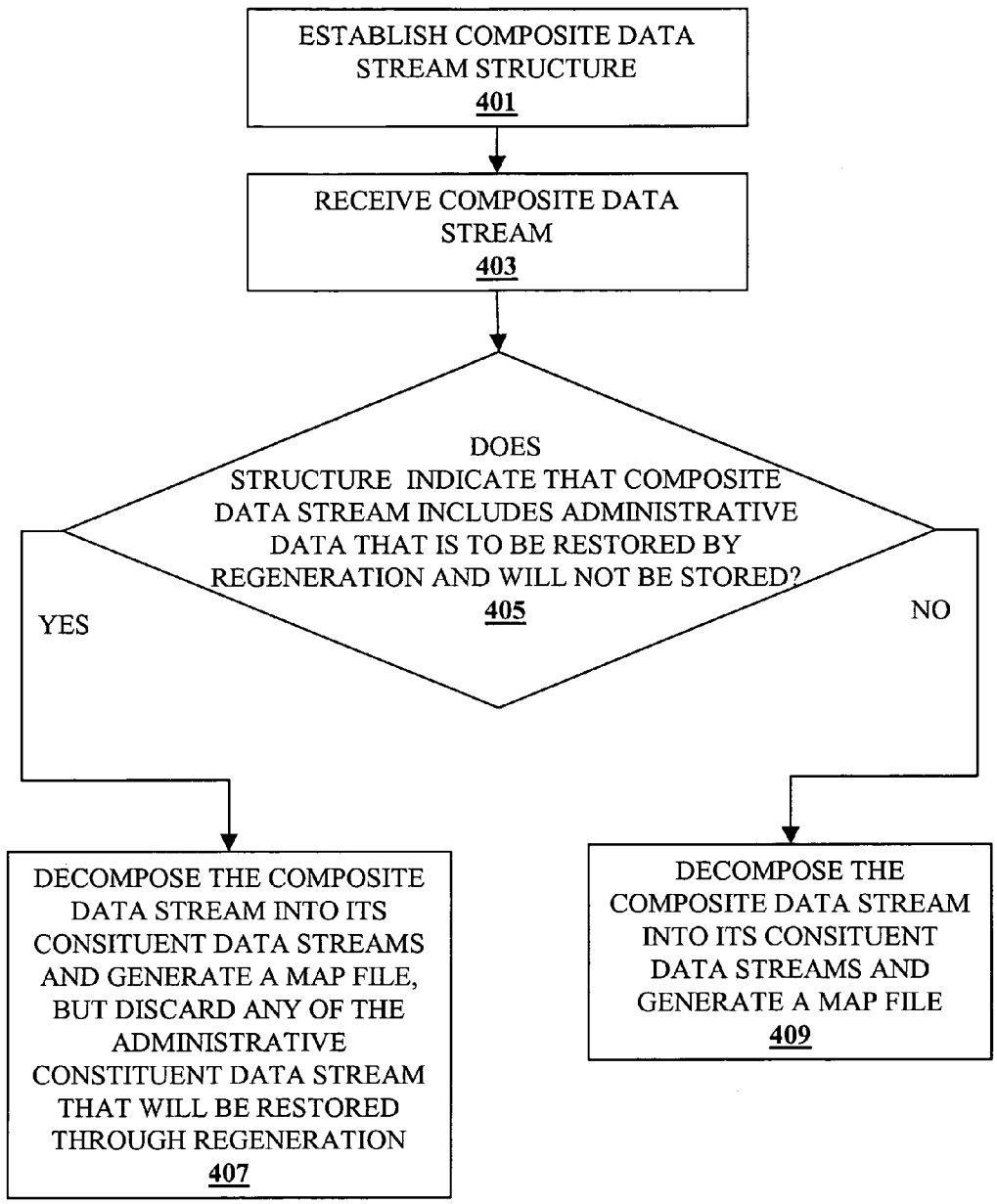
FIG. 4 is a flowchart for decomposing a composite data stream according to one embodiment of the invention.

FIG. 4 is a flowchart for decomposing a composite data stream according to one embodiment of the invention. At block 401, the structure of a composite data stream is established. As previously stated, the structure of a composite data stream may be established with a configuration file created by an administrator or received over a network, a default configuration file and/or settings, composite data stream preprocessing, information within the composite data stream, etc. At block 403, the composite data stream is received, for example, by the composite data stream decomposer/recomposer 313 of FIG. 3 or 207 of FIGS. 2A and 2B. At block 405, the composite data stream decomposer/recomposer determines if the structure of the composite data stream indicates that the composite data stream includes any administrative data that the system will restore by regenerating it (in other words, the system will restore that administrative data using an algorithm, as opposed to by accessing a copy that was stored). For example, if an embodiment of the invention implements the algorithm for generating the administrative data (the optional administrative data regenerator 320) and has all of the necessary inputs, the administrative data can be restored by regenerating it (determining it on the fly/dynamically). In contrast, if an embodiment of the invention does not implement the algorithm (e.g., it is unknown, unavailable, etc.), does not have all of the necessary inputs (e.g., one or more is unknown, unavailable, etc.), and/or the data is not of a nature that can be regenerated, the administrative data needs to be stored. If the composite data stream does include any administrative data that the system will restore by regenerating it, then control flows to block 407. However, if the composite data stream does not include any administrative data that will be regenerated, then control flows to block 409.

At block 407, the composite data stream decomposer/recomposer decomposes the composite data stream into its constituent data streams and generates a map file, but discards any administrative data that the system will restore by regenerating it. For example, in certain embodiments of the invention, tape markers are discarded and not stored in a constituent data stream file(s).

At block 409, the composite data stream decomposer/recomposer decomposes the composite data stream into its constituent data streams and generates a map file.

Figure 5:
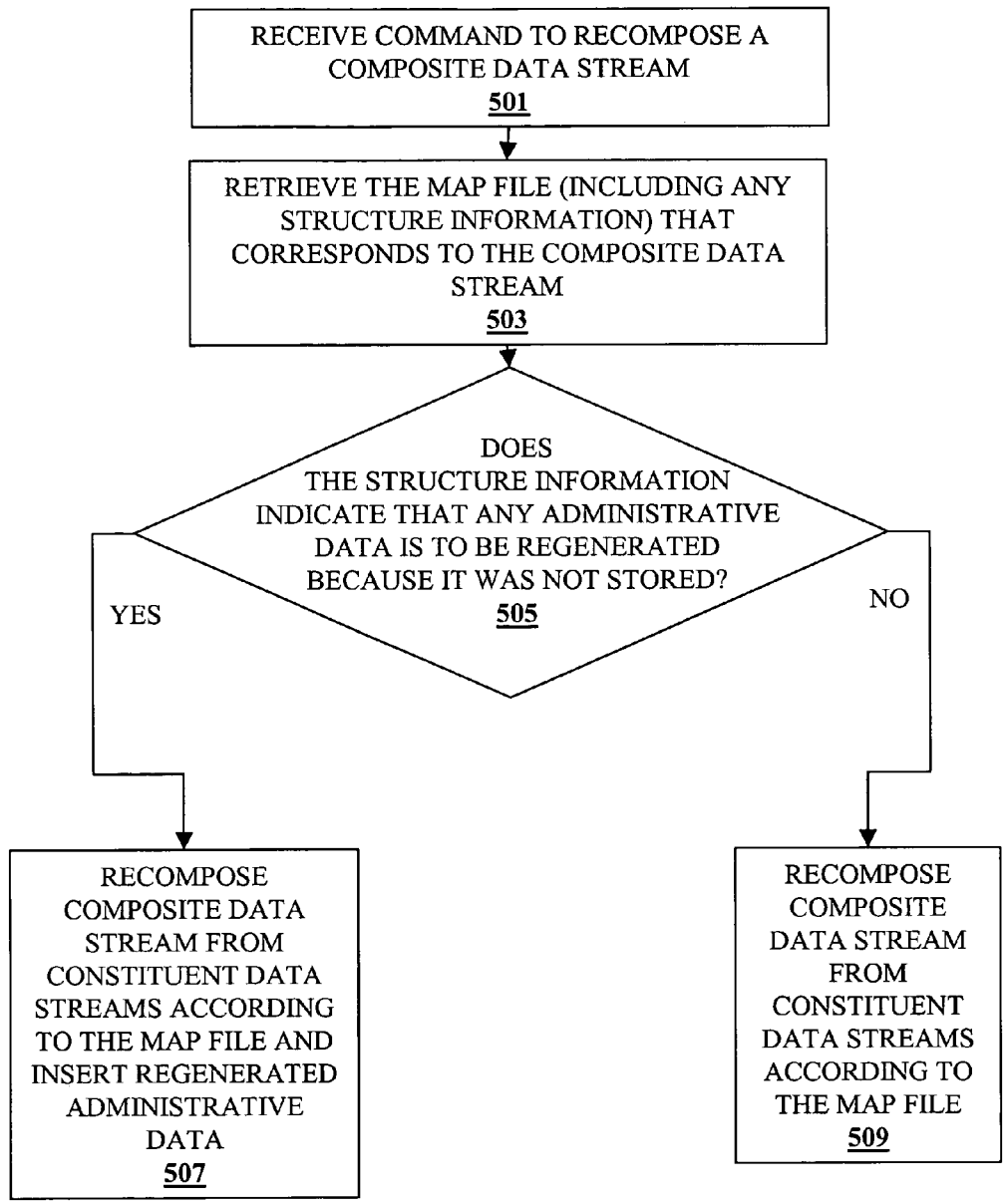
FIG. 5 is a flowchart for recomposing a composite data stream from constituent data streams according to one embodiment of the invention.

FIG. 5 is a flowchart for recomposing a composite data stream from constituent data streams according to one embodiment of the invention. At block 501, a command is received to recompose a composite data stream. The command may be from a user, from a backup server received over a network, from an agent that submits a command periodically, etc. At block 503, the composite data stream decomposer/recomposer retrieves the composite data stream map file (including any structure information) for the requested composite data stream. At block 505, the composite data stream decomposer/recomposer determines if the structure information indicates that any administrative data needs to be regenerated because it was not stored as part of the backup. If the structure information indicates that administrative data is to be regenerated, then control flows to block 507. Otherwise, control flows to block 509.

At block 507, the composite data stream decomposer/recomposer recomposes the composite data stream from constituent data streams according to the composite data stream map file, while regenerating (by a technique other than retrieval from the backup storage (e.g., calculated)) and inserting administrative data.

At block 509, the composite data stream decomposer/recomposer recomposes the composite data stream from its constituent data streams according to the map file.

Decomposing and recomposing data streams as described in FIGS. 4 and 5 further reduces the storage necessary for backing up composite data streams. In particular, data streams, or parts thereof, that can be regenerated, such as administrative data (e.g., tape markers), can be discarded and restored without consuming storage space. In addition, resources are not spent compressing and storing such data streams.

FIG. 6 is an exemplary diagram of a composite data stream map file according to one embodiment of the invention. A composite data stream 601 includes interleaved data stream blocks of a constituent data stream A 603 and a constituent data stream B 605. The composite data stream 601 is sectioned into a section 1 607 and a section 2 609. The section 1 607 and the section 2 609 logically illustrate sectioning of the composite data stream 601 for storage as files. Although section 1 607 and section 2 609 are the same size in FIG. 6, composite data streams may be sectioned into varying sizes in accordance with the described invention.

Section 1 607 and section 2 609 each include data from both constituent data streams 603 and 605.

FIG. 6 also illustrates a composite data stream map. The composite data stream map includes a composite data stream map header 611 and a composite data stream map block for each section (see composite data stream map block 613 for section 1 607). While in one embodiment of the invention a data stream map header and corresponding data stream map blocks are a single file, in alternative embodiments of the invention they are separate files. In FIG. 6, the composite data stream map header 611 includes a composite data stream identifier field, a total number of constituent data streams field, and a constituent data stream identifier field for each constituent data stream of the composite data stream. Table 1 illustrates example data in the composite data stream map header 611.

TABLE 1

Example Data in a Composite Data Stream Map Header

1A56YZCLIENTX
(Identifier for the composite data stream 601)

2
1A56YZCLIENTX_A
1A56YZCLIENTX_B

The first field in table 1 is an example identifier that can be used to identify a composite data stream; the second field indicates that there are two constituent data streams; and the third and fourth fields contain an example identifier that can be use to identify constituent data streams. Various techniques can be employed to assign identifiers to composite and constituent data streams. Alternatively, identifiers assigned by the source of the composite and/or constituent data streams can be used to differentiate between data streams. For example, in one embodiment of the invention, an identifier is the composite data stream identifier used by the source of the composite data stream and an identifier that identifies the source.

The composite data stream map block 613 illustrated in FIG. 6 includes a composite offset field, a constituent data stream offset field for each constituent data stream, and a list of composite data stream descriptors. Each composite data stream descriptor includes an identifier field for the constituent data stream corresponding to the next data stream block of the composite data stream and a length field for the length of that data stream block. The composite offset field indicates the offset in the composite data stream of the data specified by the first composite data stream descriptor in the composite data stream map block. Each descriptor indicates, in order, how much of which constituent data stream to take next to recompose the composite data stream. Each constituent data stream offset field indicates the offset in the constituent data stream of the first data specified by the first composite data stream descriptor in the map block which includes the identifier for the corresponding constituent stream. Table 2 provides an example of data in a composite data stream map block.

TABLE 2

Example Data in a Composite Data Stream Map Block

|   |     |
|---|-----|
|   | 600 |
|   | 400 |
|   | 200 |
| A | 100 |
| B | 50  |
| A | 100 |
| B | 50  |
|...|...  |

Assuming the values indicated in table 2 are in kilobytes, table 2 shows that 600 kilobytes of the composite data stream precedes the data described by the map block, 400 kilobytes of the constituent data stream A precedes the data described by the map block, and 200 kilobytes of the constituent data stream B precedes the data described by the map block. The next data in the composite data stream is 100 kilobytes from constituent stream B, followed by 50 kilobytes from constituent data stream A, and so on.

What is represented and the size of the map blocks depends on the implementation (e.g., a fixed number of bytes from the composite data stream are represented by each map block, a fixed number of data stream blocks are represented by each map block, etc.). While in one embodiment the composite data stream is sectioned, alternative embodiments of the invention do not section the composite data stream. In alternative embodiments of the invention, the map files also include indexing into data structures (e.g., trees, hash tables, etc.) that store the constituent data stream files. In another embodiment of the invention, the map files include indexing that is used to recompose the composite data stream without offset fields.

In addition to increasing the compression efficiency and reducing storage consumption, decomposing composite data streams into its constituent data streams enables selective retrieval of data from storage. For example, instead of restoring an entire composite data stream, a single constituent data stream can be selected and restored to a requesting entity.

ALTERNATIVE EMBODIMENTS

While the invention has been described in terms of several embodiments, those skilled in the art will recognize that the invention is not limited to the embodiments described. For instance, while the flow diagrams show a particular order of operations performed by certain embodiments of the invention, it should be understood that such order is exemplary (e.g., alternative embodiments may perform the operations in a different order, combine certain operations, overlap certain operations, etc.).

Thus, the method and apparatus of the invention can be practiced with modification and alteration within the spirit and scope of the appended claims. The description is thus to be regarded as illustrative instead of limiting on the invention.

We claim:

1. A computer implemented method for storing data comprising:
   receiving a composite data stream from a server;
   storing the received composite data stream that is to be restored to the server subsequently, said storing including,
      decomposing the composite data stream into a plurality of constituent data streams, the plurality of constituent data streams including at least a first constituent data stream of user data and a second constituent data stream of administrative data, wherein the composite data stream is further sectioned into one or more sections, each section including data from both the first and second constituent data streams, and wherein said decomposing includes,
         storing a composite data stream map that indicates how to recompose the plurality of constituent data streams into the composite data stream,
         wherein the composite data stream map includes a map header and one or more map blocks, each map block corresponding to a section, wherein the map header includes a composite data stream identifier identifying the associated composite data stream, a total number of constituent data streams associated with the composite data stream, and a constituent data stream identifier identifying each of the constituent data streams, and wherein each map block includes information identifying a location of each of the identified constituent data streams;
         segmenting at least one of the plurality of constituent data streams decomposed from the composite data stream;
         determining which segments resulting from the segmenting match segments already stored;
         in lieu of storing those of the segments resulting from the segmenting which are determined to match already stored segments, storing pointers to those already stored segments; and
         storing those of the segments resulting from the segmenting determined not to match already stored segments.

2. The computer implemented method of claim 1, wherein said storing the received composite data stream further comprises:
   determining the second constituent data stream is administrative data that is to be restored by regeneration rather than being stored; and
   discarding said second constituent data stream.

3. The computer implemented method of claim 2, wherein a map block of the composite data stream map further comprises a composite offset and a constituent data stream offset for each constituent data stream, wherein the composite offset specifies an offset in the composite data stream from which a starting data stream block of data to be recomposed from the constituent data streams identified by corresponding constituent data stream offsets, and wherein each constituent data stream offset indicates an offset in a corresponding constituent data stream from which the starting data stream block of data is to be recomposed.

4. The computer implemented method of claim 3, wherein the map block of the composite data stream map further comprises a list of one or more composite data stream descriptors, each corresponding to a data stream block to be recomposed for the composite data stream, wherein each composite data stream descriptor includes an identifier identifying a constituent data stream corresponding to a next data stream block and a length specifying a length of the next data stream block in an order, and wherein each composite data stream descriptor indicates, in order, how much of which constituent data stream to take next to recompose the composite data stream.

5. A computer implemented method for efficiently storing data comprising:
   receiving over time, at a storage server having a composite data stream decomposer and recomposer and a segment reuse storage system, a plurality of composite data streams from a server, each of said plurality of composite data streams representing snapshots of data residing at a set of one or more sources taken over said time, wherein the server receives data streams from the client applications, wherein at least one of the server and the client applications insert into the data streams administrative data that is expected upon restore and that if kept in the data streams would result in a relatively low compression efficiency of the segment reuse storage system; and
   storing each of said plurality of composite data streams that is to be restored to the server subsequently, said storing including,
      decomposing the composite data stream into a plurality of constituent data streams, the plurality of constituent data streams including at least a first constituent data stream of user data and a second constituent data stream of administrative data, wherein the composite data stream is further sectioned into one or more sections, each section including data from both the first and second constituent data streams, and wherein said decomposing includes, storing a composite data stream map that indicates how to recompose the plurality of constituent data streams into the composite data stream, wherein the composite data stream map includes a map header and one or more map blocks, each map block corresponding to a section, wherein the map header includes a composite data stream identifier identifying the associated composite data stream, a total number of constituent data streams associated with the composite data stream, and a constituent data stream identifier identifying each of the constituent data streams, and wherein each map block includes information identifying a location of each of the identified constituent data streams; and storing using segment reuse a set of one or more of said plurality of constituent data streams, said storing using segment reuse including performing the following for each of said set of constituent data streams, segmenting the constituent data stream, determining which segments resulting from the segmenting match segments already stored, and storing only those segments of the constituent data stream that cannot be restored using segments already stored.

6. The computer implemented met hod of claim 5, wherein said storing each of said plurality of composite data streams further comprises:

determining the second constituent data stream is administrative data that is to be restored by regeneration rather than being stored; and discarding said second constituent data stream.

7. The computer implemented method of claim 6, wherein a map block of the composite data stream map further comprises a composite offset and a constituent data stream offset for each constituent data stream, wherein the composite offset specifies an offset in the composite data stream from which a starting data stream block of data to be recomposed from the constituent data streams identified by corresponding constituent data stream offsets, and wherein each constituent data stream offset indicates an offset in a corresponding constituent data stream from which the starting data stream block of data is to be recomposed.

8. A computer implemented method for storing data comprising:

receiving, at a storage server having a composite data stream decomposer and recomposer and a segment reuse storage system, a composite data stream from a backup server, wherein the backup server is part of a backup system that includes a client application on a computer coupled to the backup server, said composite data stream representing at least a snapshot of data residing at the computer coupled to said backup server, wherein at least one of the client application and backup server insert into the composite data stream administrative data that is expected upon restore and that if kept in the composite data stream would result in a relatively low compression efficiency of the segment reuse storage system;

storing the received composite data stream that is to be restored to the backup server subsequently, said storing including, decomposing the composite data stream into a plurality of constituent data streams, the plurality of constituent data streams including at least a first constituent data stream of user data and a second constituent stream of administrative data, wherein the composite data stream is further sectioned into one or more sections, each section including data from both the first and second constituent data streams, and wherein said decomposing includes, storing a composite data stream map that indicates how to recompose the plurality of constituent data streams into the composite data stream, wherein the composite data stream map includes a map header and one or more map blocks, each map block corresponding to a section, wherein the map header includes a composite data stream identifier identifying the associated composite data stream, a total number of constituent data streams associated with the composite data stream, and a constituent data stream identifier identifying each of the constituent data streams, and wherein each map block includes information identifying a location of each of the identified constituent data streams; and backing up each of said plurality of constituent data streams separately, said backing up including, applying segment reuse to back up a set of one or more of said plurality of constituent data streams including, segmenting at least the first constituent data stream in to current segments;

determining which of the current segments match already stored segments; and storing only those of the current segments that do not match already stored segments.

9. The computer implemented method of claim 8, wherein said backing up includes:

discarding the second constituent data stream because it is administrative data that is to be restored using regeneration as opposed to storage.

10. An apparatus to back up data comprising:

a storage server including, an interface agent to receive over time composite data streams from a server representing snapshots of data residing at a set of one or more sources;

a composite data stream decomposer and recomposer, coupled to said interface agent, to decompose composite data streams into their constituent data streams and composite data stream maps, the composite data stream maps indicate how to recompose their corresponding composite data streams from their constituent data streams, the constituent data streams include at least a first constituent data stream of user data and a second constituent data stream of administrative data, and to recompose composite data streams from their constituent data streams and their composite data stream maps, wherein the composite data stream is further sectioned into one or more sections, each section including data from both the first and second constituent data streams, wherein a composite data stream map includes a map header and one or more map blocks, each map block corresponding to a section, wherein the map header includes a composite data stream identifier identifying the associated composite data stream, a total number of constituent data streams associated with the composite data stream, and a constituent data stream identifier identifying each of the constituent data streams, and wherein each map block includes information identifying a location of each of the identified constituent data streams;

a map file storage, coupled to said composite data stream decomposer and recomposer, to store the composite data stream maps; and a segment reuse storage system, coupled to said composite data stream decomposer and recomposer, to perform segment reuse to store and restore constituent data streams.

11. The apparatus of claim 10 further comprising: an administrative data regenerator, coupled to said composite data stream decomposer and recomposer, to regenerate data from constituent data streams that was not stored because that data is to be restored by regeneration.

12. The apparatus of claim 11 wherein the administrative data is regenerated in accordance with composite data stream attribute data retrieved from a configuration file.

13. The apparatus of claim 10 wherein the composite data stream decomposer and recomposer is stored in a machine-readable storage medium having stored thereon a set of instructions, which when executed by a set of one or more processors, cause the operations of the composite data stream decomposer and recomposer to be performed.

14. The apparatus of claim 10 wherein the composite data stream decomposer and recomposer is an application specific integrated circuit.

* * * * *